Nov. 9, 1937.  J. K. LUND  2,098,252
THERMOSTAT CONTROLLED VALVE
Filed Sept. 24, 1934
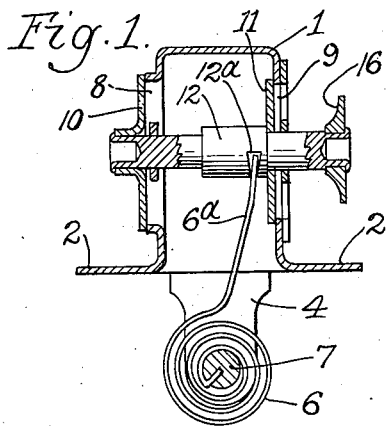
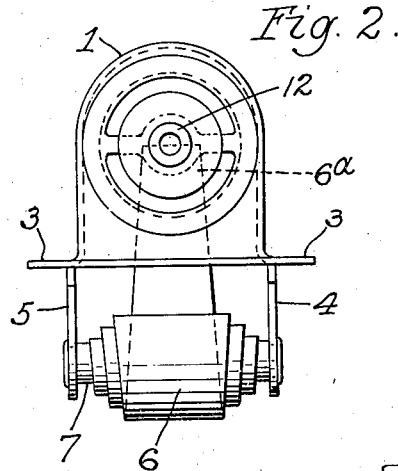
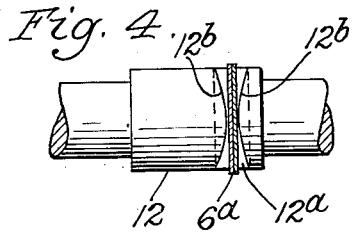
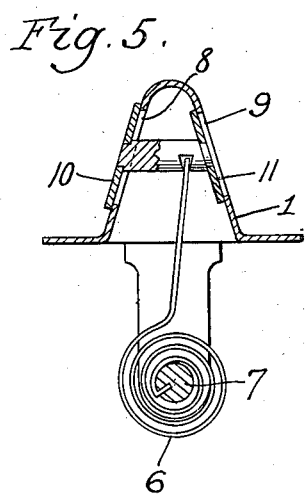
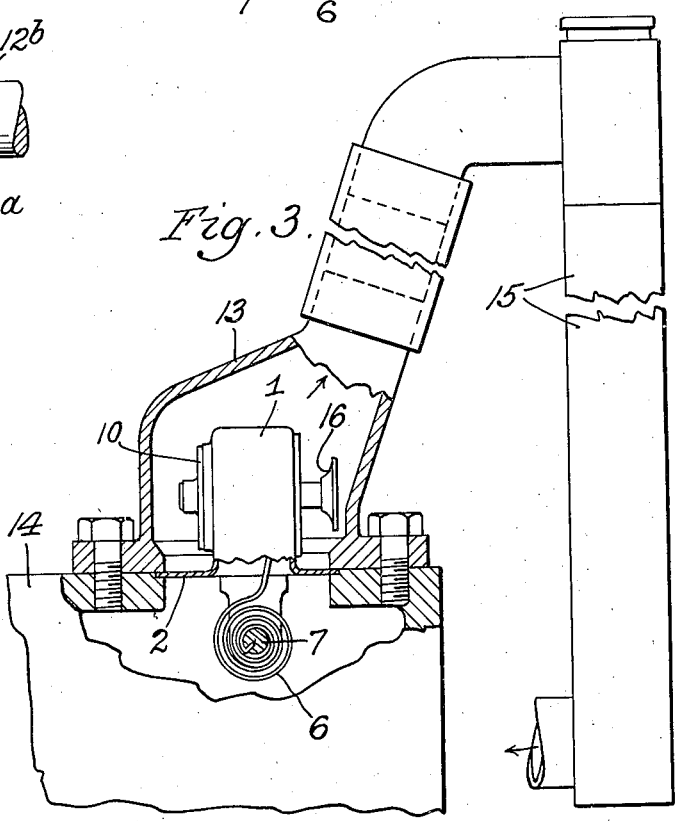
Inventor
James K. Lund
by Parker & Carter
Attorneys.

Patented Nov. 9, 1937

2,098,252

UNITED STATES PATENT OFFICE 2,098,252

THERMOSTAT CONTROLLED VALVE

James K. Lund, Chicago, Ill., assignor to The Dole Valve Company, Chicago, Ill., a corporation of Illinois Application September 24, 1934, Serial No. 745,176

9 Claims. (Cl. 236—34)

This invention relates to thermostat controlled valves and has for its object to provide a new and improved device of this description. The invention has for a further object to provide a thermostat controlled valve wherein the valve is substantially balanced when in operation. The invention has as a further object to provide a thermostat controlled valve particularly adapted for use in the cooling system of an internal combustion engine for automobiles and the like. The invention has other objects which are more particularly pointed out in the accompanying description.

Referring now to the drawing, Fig. 1 is a view showing one form of valve embodying the invention;

Fig. 2 is a side elevation of the device shown in Fig. 1;

Fig. 3 is a view showing one construction wherein the device is applied to the engine cooling system of an automobile;

Fig. 4 is an enlarged view showing one form of the slot in the connecting member between the valve members, in which the end of the thermostat is received;

Fig. 5 is a view showing a modified construction.

Like numerals refer to like parts throughout the several figures.

In the drawing I have shown one form of the device arranged to be easily inserted in the engine cooling system of an automobile. In this construction there is a casing 1 with an admission opening at one end, and having the laterally extending parts 2 and 3 which close off the passageway controlled by the valve, when the valve is closed.

Projecting from the casing 1 are the supporting members 4 and 5 for supporting the thermostat, which may be of any suitable construction. As herein shown it consists of a coil 6 of bi-metal, that is of two metals, fastened together, one of which expands more than the other when heated. One end of this coil 6 is connected to a fixed part, herein shown as a pin 12, connected with the supports 4 and 5. The other end 6a of the coil 6 is connected with the valve device so as to actuate the valve elements.

When a thermostat like that shown is utilized and the end 6a is connected with the pin or connecting member 12, the connection must have a certain amount of play, because the metal itself expands and contracts and the end changes position as the pin is moved backward and forward. In this construction, I prefer to provide the pin 12 on its bottom with a slot 12a which extends partway through the pin, as clearly shown in Fig. 1, and which is enlarged at its inner end, as shown in that figure, to give the end of the thermostatic metal room to move about. The open edge of the slot is preferably provided with the curved faces 12b which are nearer together at the middle of the pin, as shown in Fig. 4. This construction gives sufficient play for the end of the thermostat as the pin is moved back and forth.

In the construction shown, the casing 1 has the two opposed discharge ports 8 and 9 which are controlled by the valve members 10 and 11. These valve members are connected together by this connecting piece 12 which extends crosswise of the casing 1. The thermostat element 6 is connected to the connecting piece 12 so as to move it and the valve members 10 and 11 when the temperature rises above a predetermined point. It will further be noted that the valve members 10 and 11 lap the edges of the ports. By this means a tight joint is formed and thereby leakage is prevented which might tend to cause the valve to open before the thermostat acts. Such action is prevented by this lapping construction, thereby insuring tight closing of the valve members, regardless of the pressure of the system, until the thermostat acts to open the valve member.

As shown in Fig. 3, the thermostat device is located in the connection 13 between the engine jacket 14 and the radiator 15 so as to close off this connection when the valve members are in their closed positions, that is when the engine first starts up and before the cooling liquid has become heated. The thermostat 6 is in position to come in contact with the cooling liquid in the engine jacket, and when the engine starts up the cooling liquid is held in the engine jacket until the engine heats up the proper amount, and then the valve members are opened by the thermostat and the cooling liquid is circulated through the radiator and back through the engine jacket so as to properly cool the engine.

It will be noted that one of the valve members 10 is on the outside of the valve casing 1, and the other valve member 11 is inside the valve casing. When the valve members are closed, the pressure of the liquid inside the casing is substantially equal on the two valve members and is therefore substantially balanced so that the thermostat has no pressure to overcome when it starts to open the valve members. When the valve members 10 and 11 are partially open or fully open, this balanced condition is changed, for while substantially all the liquid flowing out of the casing through the port 8 strikes the outside valve member 10, this is not the case with the inside valve member 11, as some of the liquid flows out between it and the wall of the casing containing the port 9. Less pressure is therefore exerted on the inside valve member 11 than upon the outside valve member 10, and these pressures thus become unbalanced.

Some suitable means is provided for evening up the pressures exerted on the two valve members 10 and 11 when they are partially or wholly open so as to maintain the balanced pressure condition at all times. This result is secured in the construction herein illustrated by providing an auxiliary pressure surface for the inside valve member 11, of the proper amount to cause the pressure on the valve member 11 and the auxiliary pressure surface, to be substantially equal to the pressure on the valve member 10.

As herein shown there is provided an auxiliary pressure surface 16 on the outside of the casing, against which the liquid, flowing between the valve member 11 and the port 9, strikes. This auxiliary pressure surface is so proportioned that the liquid pressure on it, plus the liquid pressure on the inner face of the valve member, is substantially equal to the liquid pressure on the inner face of the valve member 10. This construction, therefore, maintains a substantially balanced pressure condition for the two valve members 10 and 11 throughout all their different positions, so that the thermostat is not required to overcome liquid pressure in moving the valve members. It will further be seen that the pressure of the liquid, due to the pump when the engine is started up, has no tendency to open the valve members, and the thermostat does not, therefore, have to exert any force to hold the valve members closed when the engine is started up. It will therefore be seen that this load is removed from the thermostat and that all the power the thermostat is required to utilize is simply that required to move the two valve members and associated parts. This construction, therefore, insures the proper control of the valve members. It also renders the thermostat entirely independent of the pressure of the liquid when the valve members are closed and makes its action solely depend on variation in temperature. With a given thermostat, therefore, the valve members will be opened at the same temperature of the liquid regardless of whether the pressure of the liquid is high or low.

In Fig. 5 there is shown a construction where the auxiliary pressure surface is omitted. In this construction the pressure on the inner surface of the two valve members is substantially the same so that the valve device is substantially balanced when the valve members are closed, the pressure of the liquid in the system having no effect to open these valve members while they are closed, the valve members being opened by the action of the thermostat alone in the same manner and under the same conditions as in the other form. In this construction I prefer to make the port 9 somewhat smaller than the port 8 and the inner face of the valve member 11 is substantially the same as the area of the port 8. In all the devices the thermostat is connected to the pin 12 at one side of the casing so that there is room for it to move sufficiently to open the valves. This is clearly shown in Figs. 1 and 5.

In all these devices the thermostat can be adjusted to open the valve members at a certain given temperature of the liquid, and when so set the valve members will not be opened until this temperature is attained.

I have illustrated the valve construction as in a particular location in the cooling system, but it is of course evident it may be placed at any other point desired, or that it may be used apart from the circulating system of an internal combustion engine.

I have described in detail two embodiments of my invention, but it is of course evident that the parts may be varied in many particulars without departing from the spirit of the invention as set out in the claims hereto appended, and I therefore do not limit myself to the construction shown.

I claim:

1. A valve device comprising a casing having an admission opening, two discharge ports, valve members controlling said discharge ports having pressure opposing faces, and an equalizing device separate from the valve members for equalizing the liquid pressure on said valve members.

2. A valve device comprising a casing having an admission opening, two discharge ports, valve members controlling said discharge ports having pressure opposing faces, an equalizing device separate from the valve members for equalizing the liquid pressure on said valve members, and a thermostat connected with said valve members for actuating them.

3. A valve device comprising a casing having an admission opening, two discharge ports, valve members controlling said discharge ports having pressure opposing faces which receive the liquid pressure, an auxiliary pressure face associated with one of said valve members, and a thermostat connected with said valve members for moving them in response to variations in temperature.

4. A valve device comprising a casing having an admission opening, two discharge ports, valve members controlling said discharge ports having pressure opposing faces, a connecting device for connecting said valve members together, a thermostat connected to said connecting device to move them with relation to said discharge ports so that one is outside of said casing and the other inside thereof, and means for equalizing the liquid pressure on the two valve members when moved from their closed positions.

5. A valve device for the cooling system of an internal combustion engine, comprising a casing having an admission opening and a discharge opening, a substantially balanced controlling device for said discharge opening, and a bi-metal thermostat for moving said controlling device, whereby the thermostat is rendered independent of the pressure of the liquid in the system.

6. A valve device comprising a casing having an admission opening, two discharge ports in the outer wall of said casing, valve members for controlling said ports, having pressure opposing faces which receive the liquid pressure, and a thermostat intermediate said valve members and connected with said valve members for moving them in response to variations in temperature.

7. A valve device comprising a casing having an admission opening, two discharge ports, valve members controlling said discharge ports having pressure opposing faces which receive the liquid pressure, an auxiliary pressure face associated with one of said valve members, and a thermostat connected with said valve members for moving them in response to variations in temperature, said valve members having a connecting member between them with an enlarged slot into which the end of the thermostat is received and in which it has play.

8. A valve device comprising a casing having an admission opening, two discharge ports, valve members for controlling said ports having pressure opposing faces which receive the liquid pressure, a thermostat located at one side of said valve members, having a part loosely connected with said valve members so as to have relative motion with relation thereto, said thermostat moving said valve members when the temperature reaches a predetermined point.

9. A valve device comprising a casing having an admission opening, two discharge ports, valve members controlling said discharge ports, one of said valve members being on the interior of the casing and the other on the exterior of the casing when the valve members are in their open position, and an equalizing device on the exterior of the casing for equalizing the liquid pressure on the valve members and means for moving said valve members to their open position.

JAMES K. LUND.